United States Patent [19]

Northe

[11] 3,984,899
[45] Oct. 12, 1976

[54] CHAIN-TYPE CHOKER HOOK
[75] Inventor: Melvin M. Northe, Portland, Oreg.
[73] Assignee: Esco Corporation, Portland, Oreg.
[22] Filed: Dec. 1, 1975
[21] Appl. No.: 636,425

[52] U.S. Cl. .......................... 24/230.5 LH; 59/93; 294/74
[51] Int. Cl.² .................. F16G 15/00; B66C 1/12
[58] Field of Search ....... 24/115 R, 115 CH, 116 R, 24/230.5 TH, 230.5 LH, 230.5 CS, 230.5 R, 230.5 CR; 294/74, 82 R; 59/93

[56] References Cited
UNITED STATES PATENTS

| | | |
|---|---|---|
| 1,764,135 | 6/1930 | Young .................................. 294/74 |
| 1,866,813 | 7/1932 | Lindvall ............................ 24/116 R |
| 2,872,716 | 2/1959 | Ehmann et al. ................ 24/115 CH |
| 3,125,355 | 3/1964 | Snuggins ...................... 24/116 R X |
| 3,276,809 | 10/1966 | Vaines et al. ............... 24/115 CH X |
| 3,901,024 | 8/1975 | Ratcliff ................................... 59/93 |

FOREIGN PATENTS OR APPLICATIONS

| | | |
|---|---|---|
| 241,783 | 11/1962 | Australia .......................... 24/116 R |

Primary Examiner—Donald A. Griffin
Attorney, Agent, or Firm—Dawson, Tilton, Fallon & Lungmus

[57] ABSTRACT

A chain type choker hook having an eye adjacent one end and a generally L-shaped slot adjacent the other end terminating in a cross-shaped opening for securing a chain end portion.

4 Claims, 9 Drawing Figures

U.S. Patent  Oct. 12, 1976  Sheet 1 of 2  3,984,899
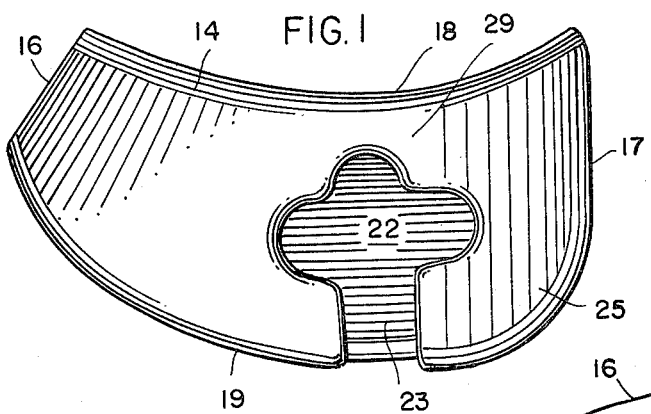
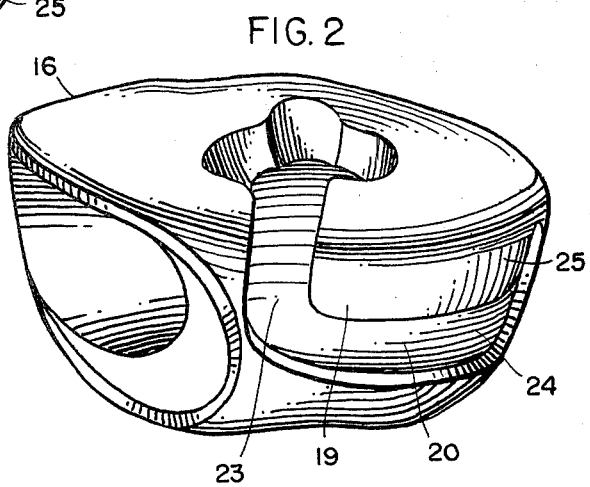
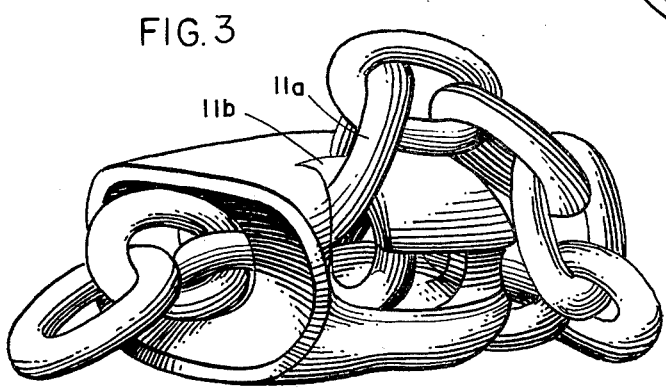
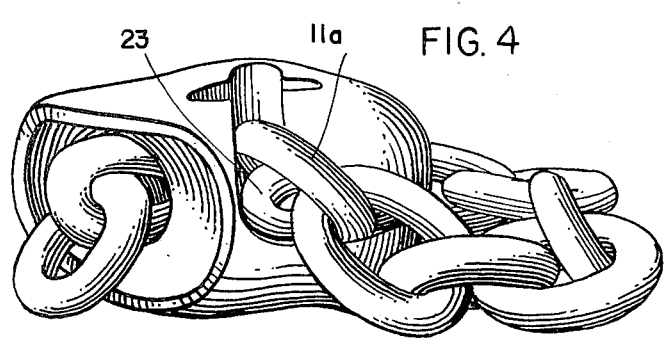
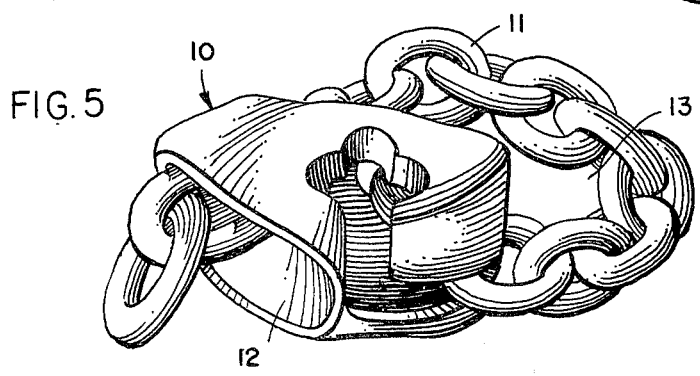

CHAIN-TYPE CHOKER HOOK

BACKGROUND AND SUMMARY OF INVENTION

This invention relates to a choker or winch line hook adapted to be used with chain. In the past, most choker and winch line hooks have been used with wire rope — see, for example, U. S. Pat. Nos. 2,872,716 and 3,276,809. Such ropes have required ferrules at the ends thereof secured to the hook body and the integrity of the fastening of the ferrules has been a continuoing concern of loggers and other users of such hooks. When the hook is used, for example, to fird a heavy log for pulling the same through the brush, tremendous force must be applied and these all focus on the connection between the ferrule and the rope. Should these forces be sufficient to cause failure of this connection, an extraordinary whipping action results which could be injurious or fatal to anyone standing nearby.

Through the use of chain instead of rope, the problem of making a secure connection between the rope and ferrule is avoided — and this is particularly advantageous since often these connections must be made in the field under less than optimum conditions. The problem in this advantageous substitution was the securement of the chain to the hook body.

This has been solved according to the instant invention through the provision of a cross-shaped opening in the hook body communicating with an internal cavity, the cross-shaped opening being extended in one leg thereof in the form of an L-shaped slot to permit movement of a chain link therein to a secured position at the end of the hook body opposite the end having the eye.

DETAILED DESCRIPTION

The invention is explained in conjunction with an illustrated embodiment in the accompnaying drawing, in which:

FIG. 1 is a perspective view of the inventive hook looking almost directly at the front wall;

FIG. 2 is another perspective view but looking essentially at one side wall but showing a portion of the front wall;

FIG. 3 is a perspective view very much like FIG. 2 but showing a chain in the process of being secured to the hook, i.e., a portion of the chain is being inserted into the cross-shaped opening in the front wall;

FIG. 4 is a perspective view like FIG. 3 but differing therefrom essentially in showing the chain being moved into the portion of a slot in a side wall;

FIG. 5 is a perspective view showing the chain in its secured position;

Referring first to FIG. 5, the inventive hook 10 is seen in what could be considered operational condition. A length of oval link chain 11 is seen secured at one end to the hook 10 with an intermediate portion of the chain 11 passing through (more properly supported in) the eye 12. It will be appreciated that a much longer length of chain is normally employed — to create the loop 13 for girding the log, for example — and to connect the loop to a tractor, winch or the like. The shorter length is illustrated here for conciseness while still showing the essential operation.

Figure 9:
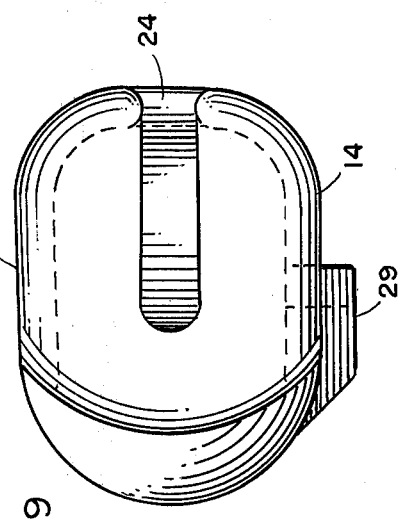
FIG. 9 is an end elevational view.

To facilitate the description of the hook, it can be considered a generally rectangular body — see FIG. 1. As such it has a front wall 14 and a rear wall 15 (see particularly FIG. 9). The body also has end walls 16 and 17 and side walls 18 and 19. The eye 12 is defined by a passage extending through the body adjacent the end wall 16 and through the side walls 18 and 19 (see FIG. 7).

Figure 7:
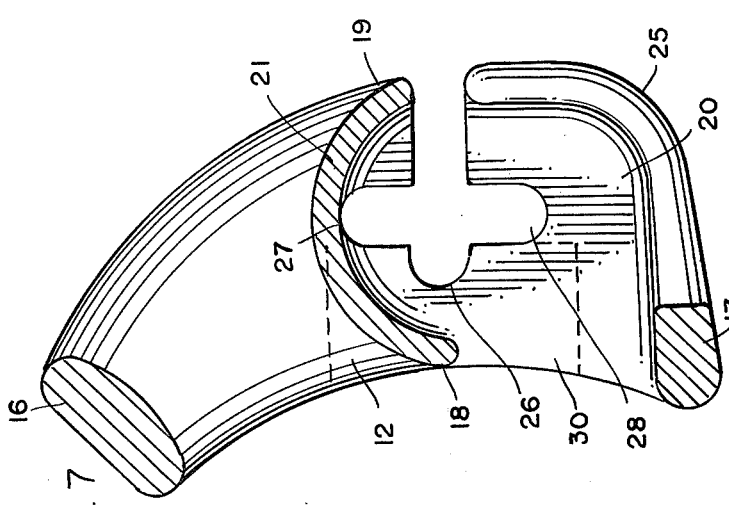
FIG. 7 is a sectional view taken along the line 7—7 of FIG. 6.

The body of the hook 10 is equipped with an internal cavity 20 (compare FIGS. 2 and 7) adjacent the end wall 17 and separated from the eye 12 by means of an arcuate cross wall 12 (best seen in FIG. 7).

The front wall 14 is equipped with a cross-shaped opening 22 therein — see FIG. 1. The cross has four legs, one of which as at 23 (compare FIGS. 1 and 2) is elongated so as to extend into the side wall 19. This elongated leg 23 is in effect a first slot portion accommodating movement of a chain link 11a from its initial inserted position (FIG. 3) toward its secured position (FIG. 5). FIG. 4, for example, depicts the link 11a at the end of the first slot portion 23 and entering the second slot portion 24 provided as an opening in the side wall 19 and extending around an arcuate corner 25 (see FIGS. 1, 2 and 7) into the end wall 17.

The junction between the slot portions 23 and 24 is essentially a right angle, i.e., the portions are generally perpendicularly related to each other. The link 11a can negotiate this right angle turn by virtue of the oval opening in the link — see particularly FIG. 4. However, the clearance is minimal so that any change in forces on the chain cannot result in chain slackening and possible movement around the turn to reach the cross 22 and thus become inadvertently detached from the hook 10.

Figure 8:
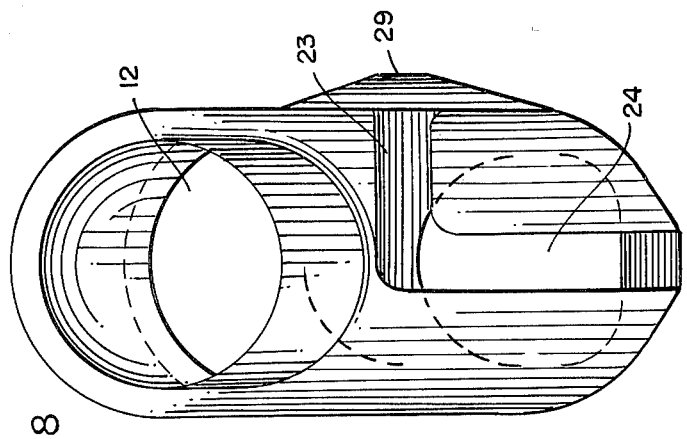
FIG. 8 is the other side elevational view.
Figure 6:
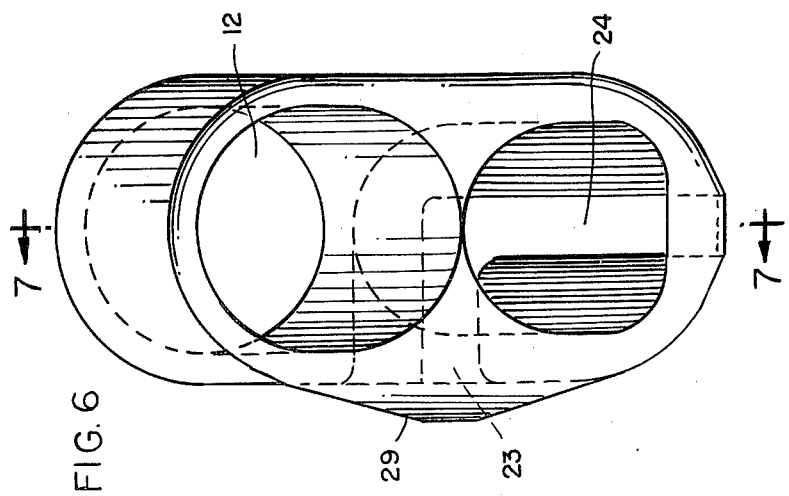
FIG. 6 is a side elevational view of the inventive hook.

The cross shaped opening 22 has a short leg 26 opposite to and aligned with the leg or slot portion 23 (see FIG. 7). The other two legs 27 and 28 (still referring to FIG. 7) are somewhat longer to facilitate entry of a link 11b (see FIG. 3) when it is symmetrically disposed about the link 11a. However, the link 11a is not symmetrically disposed relative to the link 11b — by virtue of having to shirt to conform to the shorter leg 26. The provision of a shorter leg 26 on the cross shaped opening 22 results in a substantial portion of the front wall 14 being retained, i.e., unapertured — as at 29 (see FIG. 1). This portion 29 of the wall 14 is advantageously enthickened (see particularly FIGS. 6, 8, and 9) to provide additional strength in this wall adjacent the opening 22 and the side wall 18.

Referring now to FIG. 7, it will be seen that the side wall 18 is equipped with an opening 30 communicating with the cavity 20. This provides an advantageous means for accommodating the end portion of the chain 11 — should the link 11a be to a great distance from the chain end to have all the intervening links accommodated in the cavity 20.

1. A choker hook for use with oval link chain comprising a unitary body of generally rectangular configuration and having thereby front, back, side and end walls, there being a passage through said body adjacent one of said end walls from one side wall to the other and constituting the eye through which an intermediate portion of said chain is supported, said front wall having a cross-shaped opening therein and thereby having four legs communicating with an internal cavity in said body adjacent the other of said end walls, said cavity being separated from said passage by a generally arcuate cross wall, one of said legs being elongated to provide a first slot portion extending into one of said side walls, a second slot portion in said one side wall communicating with said first slot portion and said cavity and extending generally perpendicularly to said first slot portion and toward and into said other end wall whereby an end portion of said chain is insertable into said cross shaped opening and a link thereof moved through slot portions to secure said chain end portion to said body.

2. The structure of claim 1 in which said cross-shaped opening has a leg opposite to and aligned with said one leg which is shorter than the remaining two legs.

3. The structure of claim 1 in which said body has an enthickened front wall adjacent said opening and the other of said side walls.

4. The structure of claim 1 in which said body has an opening in the other of said side walls communicating with said cavity.

* * * * *

UNITED STATES PATENT OFFICE
CERTIFICATE OF CORRECTION

Patent No. 3,984,899　　　　　　　　Dated October 12, 1976

Inventor(s) Melvin M. Northe

It is certified that error appears in the above-identified patent and that said Letters Patent are hereby corrected as shown below:

Column 2, between lines 58 and 59, insert -- I claim: --

Signed and Sealed this

Fourteenth Day of December 1976

[SEAL]

Attest:

RUTH C. MASON
Attesting Officer

C. MARSHALL DANN
Commissioner of Patents and Trademarks